(12) United States Patent  (10) Patent No.: US 11,524,902 B2
Asano et al.  (45) Date of Patent: *Dec. 13, 2022

(54) POSITIVE ELECTRODE MATERIAL AND BATTERY

(71) Applicant: Panasonic Intellectual Property Management Co., Ltd., Osaka (JP)

(72) Inventors: Tetsuya Asano, Nara (JP); Akihiro Sakai, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 326 days.

This patent is subject to a terminal disclaimer.

(21) Appl. No.: 16/914,329

(22) Filed: Jun. 27, 2020

(65) Prior Publication Data

US 2020/0328464 A1  Oct. 15, 2020

Related U.S. Application Data

(63) Continuation of application No. PCT/JP2018/046262, filed on Dec. 17, 2018.

(30) Foreign Application Priority Data

Jan. 5, 2018  (JP) .............................. JP2018-000433

(51) Int. Cl.
 *H01M 4/525*  (2010.01)
 *C01F 5/00*  (2006.01)
 (Continued)

(52) U.S. Cl.
 CPC ............... *C01F 5/00* (2013.01); *H01M 4/525* (2013.01); *H01M 10/0525* (2013.01);
 (Continued)

(58) Field of Classification Search
 CPC ............ C01F 5/00; C01F 17/36; C01G 9/006; H01M 4/525; H01M 10/0525;
 (Continued)

(56) References Cited

U.S. PATENT DOCUMENTS 4,352,869 A  10/1982 Mellors
5,506,073 A  4/1996 Angell et al.
(Continued)

FOREIGN PATENT DOCUMENTS

CN  105254184 A  1/2016
CN  105680048 A  6/2016
(Continued)

OTHER PUBLICATIONS

Richards et al. "Interface Stability in Solid-State Batteries." Chem. Mater. 2016, 28, 266-273 (Year: 2016).*

(Continued)

*Primary Examiner* — Michael L Dignan
(74) *Attorney, Agent, or Firm* — McDermott Will & Emery LLP

(57) ABSTRACT

A positive electrode material contains a positive electrode active material and a first solid electrolyte material. The first solid electrolyte material contains Li, M, and X; M at least contains yttrium; and X is at least one selected from the group consisting of Cl, Br, and I.

22 Claims, 3 Drawing Sheets

(51) Int. Cl.
*H01M 10/0525* (2010.01)
*H01M 10/0562* (2010.01)
*H01M 4/02* (2006.01)

(52) U.S. Cl.
CPC ............... *H01M 10/0562* (2013.01); *H01M 2004/028* (2013.01); *H01M 2300/008* (2013.01)

(58) Field of Classification Search
CPC ....... H01M 10/0562; H01M 2004/028; H01M 2300/008; H01M 4/131; H01M 4/62
See application file for complete search history.

(56) References Cited

U.S. PATENT DOCUMENTS

| | | | |
|---|---|---|---|
| 5,714,279 | A | 2/1998 | Zajac, Jr. et al. |
| 7,655,919 | B1 * | 2/2010 | Shah ...................... G01T 1/202 250/370.11 |
| 9,160,034 | B2 | 10/2015 | Kato et al. |
| 10,008,735 | B2 | 6/2018 | Ohtomo et al. |
| 2004/0151986 | A1 | 8/2004 | Park et al. |
| 2011/0045355 | A1 | 2/2011 | Ichikawa |
| 2012/0301796 | A1 | 11/2012 | Ohtomo et al. |
| 2012/0308900 | A1 | 12/2012 | Ogasa |
| 2013/0295464 | A1 | 11/2013 | Yanagi et al. |
| 2015/0147659 | A1 | 5/2015 | Kato |
| 2016/0103232 | A1 | 4/2016 | Ouspenski et al. |
| 2016/0149259 | A1 | 5/2016 | Osada et al. |
| 2016/0156064 | A1 | 6/2016 | Miyashita et al. |
| 2016/0204467 | A1 | 7/2016 | Nogami et al. |
| 2016/0217878 | A1 * | 7/2016 | Nino ...................... H02S 40/38 |
| 2016/0248119 | A1 | 8/2016 | Kato |
| 2016/0268630 | A1 | 9/2016 | Tsukada et al. |
| 2016/0285078 | A1 | 9/2016 | Deschamps et al. |
| 2016/0308210 | A1 | 10/2016 | Sakuda et al. |
| 2016/0359193 | A1 | 12/2016 | Yi et al. |
| 2017/0040637 | A1 | 2/2017 | Ceder et al. |
| 2017/0179481 | A1 | 6/2017 | Yamada et al. |
| 2017/0187066 | A1 | 6/2017 | Tsujimura et al. |
| 2017/0222257 | A1 | 8/2017 | Miyashita et al. |
| 2017/0229734 | A1 | 8/2017 | Furukawa et al. |
| 2017/0244097 | A1 * | 8/2017 | Ose ...................... H01M 4/136 |
| 2017/0288281 | A1 | 10/2017 | Chiang et al. |
| 2018/0183065 | A1 | 6/2018 | Sasaki |
| 2018/0269521 | A1 | 9/2018 | Ohtomo et al. |
| 2019/0067736 | A1 | 2/2019 | Yoshioka et al. |
| 2019/0088995 | A1 | 3/2019 | Asano et al. |
| 2019/0097266 | A1 | 3/2019 | Yamamoto et al. |
| 2019/0379056 | A1 * | 12/2019 | Chen ...................... H01M 4/366 |
| 2020/0212481 | A1 | 7/2020 | Nagamine et al. |
| 2020/0328454 | A1 | 10/2020 | Sakai et al. |
| 2020/0328455 | A1 | 10/2020 | Sakai et al. |
| 2020/0328457 | A1 | 10/2020 | Sakai et al. |
| 2020/0328460 | A1 | 10/2020 | Asano et al. |
| 2020/0328461 | A1 | 10/2020 | Asano et al. |
| 2020/0328462 | A1 | 10/2020 | Asano et al. |
| 2020/0328465 | A1 | 10/2020 | Sakaida et al. |
| 2020/0328468 | A1 | 10/2020 | Sakaida et al. |
| 2020/0328469 | A1 | 10/2020 | Asano et al. |
| 2020/0335817 | A1 | 10/2020 | Asano et al. |
| 2020/0350615 | A1 | 11/2020 | Sakaida et al. |
| 2020/0350622 | A1 | 11/2020 | Sakaida et al. |

FOREIGN PATENT DOCUMENTS

| | | |
|---|---|---|
| CN | 108701860 A | 10/2018 |
| EP | 2916381 B1 | 6/2016 |
| EP | 3428929 A1 | 1/2019 |
| EP | 3496202 A1 | 6/2019 |
| EP | 3736831 A1 | 11/2020 |
| EP | 3736834 A1 | 11/2020 |
| EP | 3736899 A1 | 11/2020 |
| EP | 3745422 A1 | 12/2020 |
| EP | 3745518 A1 | 12/2020 |
| IN | 201847045950 A | 2/2019 |
| JP | S57-132677 A | 8/1982 |
| JP | H05-306117 A | 11/1993 |
| JP | 8-171938 | 7/1996 |
| JP | 9-293516 | 11/1997 |
| JP | 11-238528 A | 8/1999 |
| JP | 2001-052733 | 2/2001 |
| JP | 2004-235155 A | 8/2004 |
| JP | 2006-244734 | 9/2006 |
| JP | 2006244734 * 11/2006 ............. Y02E 60/10 |
| JP | 2008-021556 A | 1/2008 |
| JP | 2011-129312 | 6/2011 |
| JP | 5076134 B2 | 11/2012 |
| JP | 2012-246196 A | 12/2012 |
| JP | 2013-073791 A | 4/2013 |
| JP | 2015-011901 A | 1/2015 |
| JP | 2015-032529 A | 2/2015 |
| JP | 2015-056349 A | 3/2015 |
| JP | 2016-024874 A | 2/2016 |
| JP | 2016-171067 A | 9/2016 |
| JP | 2017-059342 | 3/2017 |
| JP | 2017-091953 A | 5/2017 |
| JP | 2017-091955 A | 5/2017 |
| JP | 2017-117753 A | 6/2017 |
| JP | 2017-518622 A | 7/2017 |
| JP | 2017-152324 A | 8/2017 |
| JP | 6222134 B2 | 11/2017 |
| JP | 2017-224474 | 12/2017 |
| WO | 2011/073798 A2 | 6/2011 |
| WO | 2015/011937 A1 | 1/2015 |
| WO | 2015/030052 A1 | 3/2015 |
| WO | 2015/049986 A1 | 4/2015 |
| WO | 2017/108105 A1 | 6/2017 |
| WO | 2017/154766 A1 | 9/2017 |
| WO | 2017/154922 A1 | 9/2017 |
| WO | 2018/025582 A1 | 2/2018 |
| WO | 2019/146218 A1 | 8/2019 |
| WO | 2019/146219 A1 | 8/2019 |

OTHER PUBLICATIONS

English Translation of Chinese Search Report dated Jul. 6, 2021 for the related Chinese Patent Application No. 201880071236.0.
English Translation of Chinese Search Report dated Jul. 30, 2021 for the related Chinese Patent Application No. 201880071076.X.
English Translation of Chinese Search Report dated Aug. 2, 2021 for the related Chinese Patent Application No. 201880070620.9.
Indian Examination Report dated Apr. 29, 2022 for the related Indian Patent Application No. 202047027475.
Indian Examination Report dated May 25, 2022 for the related Indian Patent Application No. 202047027723.
Indian Examination Report dated Jun. 13, 2022 for the related Indian Patent Application No. 202047027726.
Indian Examination Report dated Jun. 14, 2022 for the related Indian Patent Application No. 202047027488.
Tomita, Y. et al., "Substitution effect of ionic conductivity in lithium ion conductor, Li3InBr6-xClx.," Solid State Ionics 179.21-26 (2008): 867-870. (Year: 2008).
Steiner, H-J., and H. D. Lutz, "Neue schnelle Ionenleiter vom Typ MI3 MIIICl6 (MI=Li, Na, Ag; MIII=In, Y)." Zeitschrift fur anorganhische und allgemeine Chemie 613.7 (1992): 26-30 (Year: 1992).
Tomita, Yasumasa et al. "Substitution effect in the ion conductor Li3InBr6, studied by nuclear magnetic resonance." Zeitschrift fur Naturforschung A 57.6-7 (2002): 447-450 (Year: 2002).
Tomita, Yasumasa et al. "Synthesis of Li3+ xIn1-xMxBr6 (M=Zn, Co, Fe) by Nano-grinding and their Ionic Conductivity." Transactions of the Materials Research Society of Japan 33.4 (2008): 973-976 (Year: 2008).
G. J. Kipouros et al. Reversible Electrode Potentials for Formation of Solid and Liquid Chlorozirconate and Chlorohafnate Compounds (Year: 1992).
Indian Examination Report dated Mar. 28, 2022 for the related Indian Patent Application No. 202047027797.
Indian Examination Report dated Apr. 4, 2022 for the related Indian Patent Application No. 202047027476.

(56) References Cited

OTHER PUBLICATIONS

Indian Examination Report dated Jun. 21, 2022 for the related Indian Patent Application No. 202047027487.
International Search Report of International Application No. PCT/JP2018/043363 dated Feb. 19, 2019.
International Search Report of International Application No. PCT/JP2018/041893 dated Feb. 19, 2019.
International Search Report of International Application No. PCT/JP2018/041892 dated Feb. 19, 2019.
International Search Report of International Application No. PCT/JP2018/041894 dated Feb. 19, 2019.
International Search Report of International Application No. PCT/JP2018/046258 dated Feb. 5, 2019.
International Search Report of International Application No. PCT/JP2018/046259 dated Mar. 12, 2019.
International Search Report of International Application No. PCT/JP2018/046260 dated Mar. 12, 2019.
International Search Report of International Application No. PCT/JP2018/041900 dated Feb. 19, 2019.
International Search Report of International Application No. PCT/JP2018/041897 dated Feb. 19, 2019.
International Search Report of International Application No. PCT/JP2018/046263 dated Mar. 19, 2019.
International Search Report of International Application No. PCT/JP2018/046264 dated Mar. 19, 2019.
International Search Report of International Application No. PCT/JP2018/042061 dated Feb. 19, 2019.
International Search Report of International Application No. PCT/JP2018/042062 dated Feb. 19, 2019.
Yasumasa Tomita et al., "Preparation of Substituted Compounds of Lithium Indium Bromide and Fabrication of all Solid-State battery", Recent Innovations in Chemical Engineering, 2017, 10, 12-17.
The Extended European Search Report dated Jan. 29, 2021 for the related European Patent Application No. 18898666.5.
The Extended European Search Report dated Feb. 5, 2021 for the related European Patent Application No. 18898795.2.
The Extended European Search Report dated Feb. 9, 2021 for the related European Patent Application No. 18898242.5.
The Extended European Search Report dated Feb. 9, 2021 for the related European Patent Application No. 18898043.7.
The Extended European Search Report dated Feb. 9, 2021 for the related European Patent Application No. 18898663.2.
The Extended European Search Report dated Feb. 9, 2021 for the related European Patent Application No. 18898873.7.
The Extended European Search Report dated Feb. 9, 2021 for the related European Patent Application No. 18898935.4.
The Extended European Search Report dated Feb. 9, 2021 for the related European Patent Application No. 18902720.4.
The Extended European Search Report dated Feb. 9, 2021 for the related European Patent Application No. 18898525.3.
The Extended European Search Report dated Feb. 10, 2021 for the related European Patent Application No. 18898462.9.
The Extended European Search Report dated Feb. 15, 2021 for the related European Patent Application No. 18898524.6.
Lutz H D et al: "Ionic motion of tetrahedrally and octahedrally coordinated lithium ions in ternary and quaternary halides", Solid State Ionics, North Holland Pub. Company. Amsterdam; NL, NL, vol. 28-30, Sep. 1, 1988?(Sep. 1, 1988), pp. 1282-1286, XP024682689.
Tetsuya Asano; Akihiro Sakai; Satoru Ouchi; Masashi Sakaida; Akinobu Miyazaki; Shinya Hasegawa: "Solid Halide Electrolytes with High Lithium-Ion Conductivity for Application in 4 V Class Bulk-Type All-Solid-State Batteries", Advanced Materials, vol. 30, No. 44, Sep. 14, 2018?(Sep. 14, 2018), p. 1803075, XP055721991.
International Search Report of PCT application No. PCT/JP2018/046262 dated Mar. 19, 2019.
Andreas Bohnsack et al., "The bromides Li3MBr6 (M=Sm—Lu,Y): Synthesis, Crystal Structure, and Ionic Mobility", Journal of Inorganic and General Chemistry, Sep. 1997, vol. 623/Issue 9, pp. 1352-1356.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.
Yasumasa Tomita et al., "Lithium ion conductivity of Li3InBr6 doped with different element", Denka Chemical Society 70th Anniversary Conference Abstracts, Mar. 25, 2003, p. 384.

\* cited by examiner

POSITIVE ELECTRODE MATERIAL AND BATTERY

BACKGROUND

1. Technical Field

The present disclosure relates to a positive electrode material for a battery and relates to a battery.

2. Description of the Related Art

Japanese Unexamined Patent Application Publication No. 2011-129312 discloses an all-solid battery using a sulfide solid electrolyte.

Japanese Unexamined Patent Application Publication No. 2006-244734 discloses an all-solid battery using a halide including indium as a solid electrolyte.

SUMMARY

In one general aspect, the techniques disclosed here feature a positive electrode material in an aspect of the present disclosure contains a positive electrode active material and a first solid electrolyte material. The first solid electrolyte material contains Li, M, and X. M at least contains yttrium. X is at least one selected from the group consisting of Cl, Br, and I.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
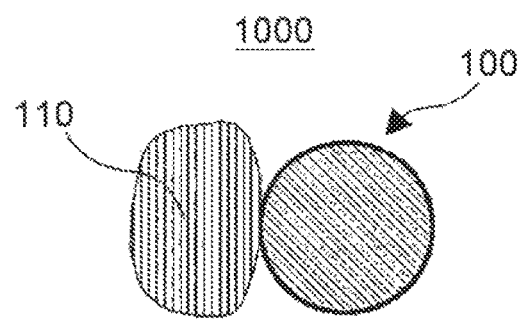
FIG. 1 is a cross-sectional view illustrating a schematic structure of the positive electrode material according to Embodiment 1.

Embodiments of the present disclosure will now be described with reference to the drawings.

Embodiment 1

The positive electrode material according to Embodiment 1 contains a positive electrode active material and a first solid electrolyte material. The first solid electrolyte material contains Li, M, and X. M at least contains yttrium. X is at least one selected from the group consisting of Cl, Br, and I.

The first solid electrolyte material need not contain sulfur.

The first solid electrolyte material may be a material represented by compositional formula (1): $Li_\alpha M_\beta X_\gamma$, where $\alpha$, $\beta$, and $\gamma$ are all values larger than 0.

According to the composition described above, the charge and discharge efficiency of the battery can be improved.

Japanese Unexamined Patent Application Publication No. 2011-129312 discloses an all-solid battery using a sulfide solid electrolyte. In order to secure an ion conductive path in the positive electrode active material, a layer made of a material mixture of a sulfide solid electrolyte and a positive electrode active material is used as the positive electrode layer. The present inventors have investigated and consequently found that in the same configuration as that in Japanese Unexamined Patent Application Publication No. 2011-129312 (that is, a battery configuration including a sulfide solid electrolyte), the charge and discharge efficiency is insufficient.

Japanese Unexamined Patent Application Publication No. 2006-244734 discloses an all-solid secondary battery in which a layer made of a positive electrode active material or a layer made of a positive electrode active material and a conducting agent is used as the positive electrode layer and a layer made of a compound including indium is used as the solid electrolyte layer. The present inventors have investigated and consequently found that in the same configuration as that in Japanese Unexamined Patent Application Publication No. 2006-244734 (that is, a battery configuration including a positive electrode layer made of a positive electrode active material and a solid electrolyte layer made of a halide including indium), the charge and discharge efficiency is insufficient. In particular, it was found that when the average discharge potential of a positive electrode active material is higher than the redox potential of Li metal by 3.7 V or more, the charge and discharge efficiency decreases.

In contrast, the present inventors have found that in a solid battery including a positive electrode layer made of a material mixture of a halide solid electrolyte as a first solid electrolyte material and a positive electrode active material, not only the rate of utilization of the active material is increased, but also the charge and discharge efficiency is improved, by forming the positive electrode layer of the material mixture. In particular, it was found that when the average discharge potential of the positive electrode active material is higher than the redox potential of Li metal by 3.7 V or more, the charge and discharge efficiency is improved. Examples of such a positive electrode active material include positive electrode active materials including at least one selected from the group consisting of cobalt, nickel, manganese, and aluminum; lithium; and oxygen, such as $LiCoO_2$, $Li(NiCoMn)O_2$, and $Li(NiCoAl)O_2$.

Although the factor of the above is not clear, it is probably because that in the configuration of Embodiment 1, an electrochemically stable and good interface is formed between the halide solid electrolyte and the positive electrode active material. It is inferred that the interface resistance is reduced by the formation of the stable and good interface.

Incidentally, the "semimetal element" refers to B, Si, Ge, As, Sb, and Te.

In addition, the "metal element" refers to all elements in groups 1 to 12 of the periodic table excluding hydrogen and all elements in groups 13 to 16 excluding the semimetal elements, C, N, P, O, S, and Se, i.e., a group of elements that can become a cation when an inorganic compound is formed with a halide.

Furthermore, in the compositional formula (1), M may contain Y (yttrium).

That is, the first solid electrolyte material may contain Y as a metal element.

According to the composition described above, the ionic electrical conductivity of the first solid electrolyte material can be further improved. Consequently, the charge and discharge efficiency of the battery can be further improved.

The first solid electrolyte material containing Y is may be a compound represented by, for example, a compositional formula: $Li_aMe_bY_cX_6$ (a+mb+3c=6 and c>0 are satisfied) (Me: at least one of metal elements other than Li and Y and semimetal elements) (m: the valence of Me).

Me may be any of Mg, Ca, Sr, Ba, Zn, Sc, Al, Ga, Bi, Zr, Hf, Ti, Sn, Ta, and Nb or a mixture thereof.

According to the composition described above, the ionic electrical conductivity of the first solid electrolyte material can be further improved.

Furthermore, the first solid electrolyte material may be $Li_3YCl_6$ or $Li_3YBr_6$.

According to the composition described above, the ionic electrical conductivity of the first solid electrolyte material can be further improved. Consequently, the charge and discharge efficiency of the battery can be further improved.

Furthermore, in the compositional formula (1), M may contain an element selected from the group consisting of Ca, Sr, Ba, and Zn, and yttrium.

According to the composition described above, the ionic electrical conductivity of the first solid electrolyte material can be further improved. Consequently, the charge and discharge efficiency of the battery can be further improved.

Furthermore, the first solid electrolyte material may be $Li_{3.1}Y_{0.9}Ca_{0.1}Cl_6$, $Li_{3.1}Y_{0.9}Sr_{0.1}Cl_6$, $Li_{3.1}Y_{0.9}Ba_{0.1}Cl_6$, or $Li_{3.1}Y_{0.9}Zn_{0.1}Cl_6$.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A1): $Li_{6-3d}Y_dX_6$,
where X is two or more elements selected from the group consisting of Cl, Br, and I.

In addition, in the compositional formula (A1), $0<d<2$ is satisfied.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A2): $Li_3YX_6$,
where X is two or more elements selected from the group consisting of Cl, Br, and I.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A3): $Li_{3-3\delta}Y_{1+\delta}Cl_6$,
where $0<\delta\leq0.15$ is satisfied.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A4): $Li_{3-3\delta}Y_{1+\delta}Br_6$, where $0<\delta\leq0.25$ is satisfied.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A5): $Li_{3-a\delta+a}Y_{1+\delta-a}Me_aCl_{6-x-y}Br_xI_y$,
where Me is at least one selected from the group consisting of Mg, Ca, Sr, Ba, and Zn.

In addition, in the compositional formula (A5), $-1<\delta<2$, $0<a<3$, $0<(3-3\delta+a)$, $0<(1+\delta-a)$, $0\leq x\leq 6$, $0\leq y\leq 6$, and $(x+y)\leq 6$ are satisfied.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A6): $Li_{3-3\delta}Y_{1+-a}Me_aCl_{6-x-y}Br_xI_y$,
where Me is at least one selected from the group consisting of Al, Sc, Ga, and Bi.

In addition, in the compositional formula (A6), $-1<\delta<1$, $0<a<2$, $0<(1+\delta-a)$, $0\leq x\leq 6$, $0\leq y\leq 6$, and $(x+y)\leq 6$ are satisfied.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A7): $Li_{3-3\delta-a}Y_{1+\delta-a}Me_aCl_{6-x-y}Br_xI_y$,
where Me is at least one selected from the group consisting of Zr, Hf, and Ti.

In addition, in the compositional formula (A7), $-1<\delta<1$, $0<a<1.5$, $0<(3-3\delta-a)$, $0<(1+\delta-a)$, $0\leq x\leq 6$, $0 \leq y \leq 6$, and $(x+y) \leq 6$ are satisfied.

According to the composition described above, the ionic electrical conductivity of the first solid electrolyte material can be further improved. Consequently, the charge and discharge efficiency of the battery can be further improved.

Furthermore, the first solid electrolyte material may be a material represented by compositional formula (A8): $Li_{3-3\delta-2a}Y_{1+\delta-a}Me_aCl_{6-x-y}Br_xI_y$, where Me is at least one selected from the group consisting of Ta and Nb.

In addition, in the compositional formula (A8), $-1 < \delta < 1$, $0 < a < 1.2$, $0 < (3-3\delta-2a)$, $0 < (1+\delta-a)$, $0 \leq x \leq 6$, $0 \leq y \leq 6$, and $(x+y) \leq 6$ are satisfied.

According to the composition described above, the ionic electrical conductivity of the first solid electrolyte material can be further improved. Consequently, the charge and discharge efficiency of the battery can be further improved.

Furthermore, as the first solid electrolyte material, for example, $Li_3YX_6$, $Li_2MgX_4$, $Li_2FeX_4$, $Li(Al, Ga, In)X_4$, or $Li_3(Al, Ga, In)X_6$ can be used.

The positive electrode active material includes a material that has a property of occluding and releasing metal ions (for example, lithium ions). The positive electrode active material may be a material including, for example, at least one selected from the group consisting of cobalt, nickel, manganese, and aluminum; lithium; and oxygen. As the positive electrode active material, for example, a lithium-containing transition metal oxide (for example, $Li(NiCoAl)O_2$, $Li(NiCoMn)_2$, and $LiCoO_2$), a transition metal fluoride, a polyanion or fluorinated polyanion material, a transition metal sulfide, a transition metal oxysulfide, or a transition metal oxynitride can be used. In particular, when a lithium-containing transition metal oxide is used as the positive electrode active material, the manufacturing cost can be reduced, and the average discharge potential can be increased.

In particular, the average charge and discharge potential of the positive electrode active material may be higher than the redox potential of Li metal by 3.7 V vs Li/Li$^+$ or more. The average charge and discharge potential of the positive electrode active material can be determined, for example, from the average voltage when charge and discharge are performed in Li insertion and deinsertion of the positive electrode active material using Li metal as the counter electrode. When a material other than Li metal is used as the counter electrode, the average potential may be determined by adding the potential relative to metal lithium of the material used as the counter electrode to the charge and discharge curve. In such a case, considering the ohmic loss, the charge and discharge may be performed at a relatively low current value.

According to the composition described above, the energy density of the battery can be further increased.

Furthermore, in Embodiment 1, the positive electrode active material may be lithium cobalt oxide, lithium nickel cobalt manganese oxide, or lithium nickel cobalt aluminum oxide. For example, the positive electrode active material may be $LiCoO_2$, $Li(NiCoMn)O_2$, or $Li(NiCoAl)O_2$.

According to the composition described above, the charge and discharge efficiency of the battery can be further improved.

FIG. 1 is a cross-sectional view illustrating a schematic structure of the positive electrode material 1000 according to Embodiment 1.

The positive electrode material 1000 according to Embodiment 1 includes a material mixture of a first solid electrolyte particle 100 and a positive electrode active material particle 110.

The first solid electrolyte particle 100 is a particle made of the first solid electrolyte material according to Embodiment 1 or a particle including the first solid electrolyte material according to Embodiment 1 as a main component (for example, in a weight proportion of 50% or more (50 wt % or more) based on the total amount of the first solid electrolyte particle 100).

In addition, in Embodiment 1, the shape of the first solid electrolyte particle 100 is not particularly limited and may be, for example, needle-like, spherical, or elliptic spherical. For example, the shape of the first solid electrolyte particle 100 may be particulate.

For example, when the shape of the first solid electrolyte particle 100 according to Embodiment 1 is particulate (for example, spherical), the median diameter may be 100 μm or less. When the median diameter is larger than 100 μm, there is a risk that the positive electrode active material particle 110 and the first solid electrolyte particle 100 cannot form a good dispersion state in the positive electrode material. Consequently, the charge and discharge characteristics are decreased. In addition, in Embodiment 1, the median diameter may be 10 μm or less.

According to the configuration described above, in the positive electrode material, the positive electrode active material particle 110 and the first solid electrolyte particle 100 can form a good dispersion state.

In addition, in Embodiment 1, the first solid electrolyte particle 100 may be smaller than the median diameter of the positive electrode active material particle 110.

According to the configuration described above, the first solid electrolyte particle 100 and the positive electrode active material particle 110 can form a better dispersion state in the electrode.

The median diameter of the positive electrode active material particle 110 may be 0.1 μm or more and 100 μm or less.

When the median diameter of the positive electrode active material particle 110 is smaller than 0.1 μm, there is a risk that the positive electrode active material particle 110 and the first solid electrolyte particle 100 cannot form a good dispersion state in the positive electrode material. Consequently, the charge and discharge characteristics of the battery are decreased. In addition, when the median diameter of the positive electrode active material particle 110 is larger than 100 μm, the lithium diffusion in the positive electrode active material particle 110 slows down. Consequently, high output operation of the battery may be difficult.

The median diameter of the positive electrode active material particle 110 may be larger than that of the first solid electrolyte particle 100. Consequently, the positive electrode active material particle 110 and the first solid electrolyte particle 100 can form a good dispersion state.

In addition, the positive electrode material 1000 according to Embodiment 1 may include a plurality of types of the first solid electrolyte particles 100 and a plurality of types of the positive electrode active material particles 110.

In addition, in the positive electrode material 1000 according to Embodiment 1, the content of the first solid electrolyte particle 100 and the content of the positive electrode active material particle 110 may be the same as or different from each other.

Furthermore, in Embodiment 1, the first solid electrolyte material may be in contact with the positive electrode active material.

That is, the first solid electrolyte particle 100 and the positive electrode active material particle 110 may be in direct contact with each other to form an interface without artificially forming an interface layer between the first solid electrolyte particle 100 and the positive electrode active material particle 110. That is, any heteroelement that is not included in the component elements of the first solid electrolyte particle 100 and the positive electrode active material particle 110 need not to be present between the first solid electrolyte particle 100 and the positive electrode active material particle 110.

According to the configuration described above, the ionic resistance between the positive electrode active material particle 110 and the first solid electrolyte particle 100 can be reduced. Furthermore, the electronic resistance in the positive electrode layer can be reduced.

Method for Manufacturing First Solid Electrolyte Material

The first solid electrolyte material according to Embodiment 1 can be manufactured by, for example, the following method.

Binary halide raw material powders are prepared so as to give a desired compositional ratio. For example, when $Li_3YCl_6$ is produced, LiCl and $YCl_3$ are prepared in a molar ratio of 3:1.

On this occasion, "M", "Me", and "X" in the above-mentioned compositional formula can be determined by selecting the types of the raw material powders. In addition, the above-mentioned values, "α", "β", "γ", "d", "δ", "a", "x", and "y", can be adjusted by adjusting the raw materials, compounding ratio, and synthesis process.

The raw material powders are thoroughly mixed and are then mixed, pulverized, and reacted with each other using a method of mechanochemical milling. Alternatively, the raw material powders may be thoroughly mixed and then burned in vacuum.

Consequently, a solid electrolyte material including a crystalline phase as described above can be obtained.

Furthermore, the crystalline phase constitution and the crystalline structure in the solid electrolyte material can be determined by adjusting the reaction method between raw material powders and the reaction conditions.

Example 2

Embodiment 2 will now be described. Description overlapping with the above-described Embodiment 1 will be appropriately omitted.

Figure 2:
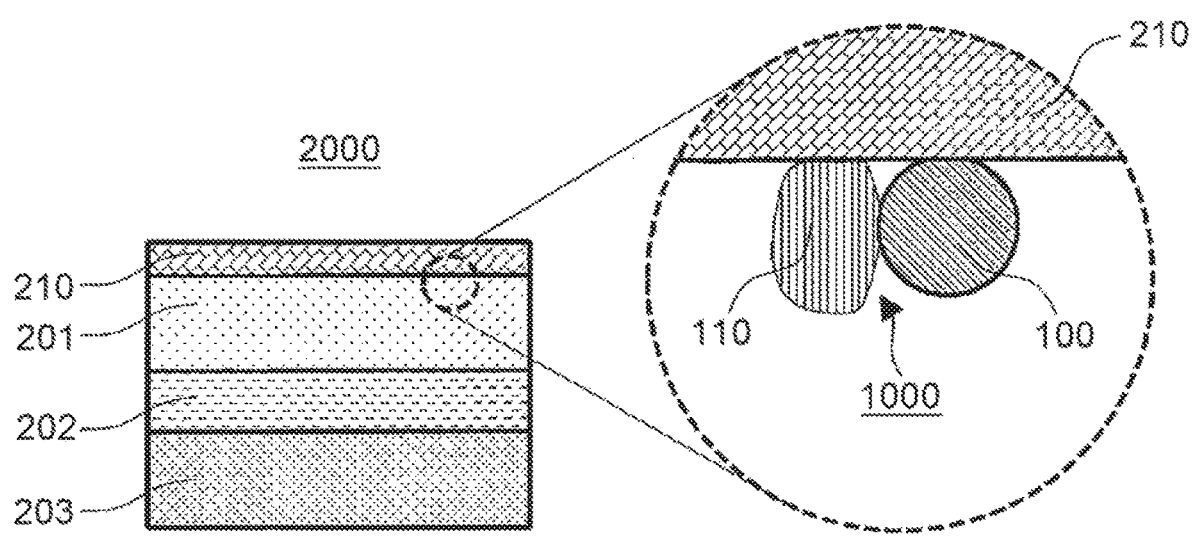
FIG. 2 is a cross-sectional view illustrating a schematic structure of the battery according to Embodiment 2.

FIG. 2 is a cross-sectional view illustrating a schematic structure of the battery 2000 according to Embodiment 2.

The battery 2000 according to Embodiment 2 includes a positive electrode 201, an electrolyte layer 202, and a negative electrode 203.

The positive electrode 201 includes the positive electrode material (for example, the positive electrode material 1000) according to Embodiment 1.

The electrolyte layer 202 is disposed between the positive electrode 201 and the negative electrode 203.

According to the configuration described above, the charge and discharge efficiency of the battery can be improved.

In the volume ratio of the positive electrode active material particle 110 and the first solid electrolyte particle 100 included in the positive electrode 201, "v: 100−v", 30≤v≤95 may be satisfied. When v<30, there is a risk of difficulty in securing a sufficient energy density of the battery. In addition, when v>95, there is a risk of difficulty in high output operation.

The positive electrode 201 may have a thickness of 10 μm or more and 500 μm or less. Incidentally, when the thickness of the positive electrode 201 is less than 10 μm, there is a risk of difficulty in securing a sufficient energy density of the battery. Furthermore, when the thickness of the positive electrode 201 is higher than 500 μm, there is a risk of difficulty in high output operation.

Furthermore, the battery 2000 according to Embodiment 2 may further include a positive electrode current collector 210.

The positive electrode current collector 210 is a current collector disposed in contact with the positive electrode.

In such a case, the first solid electrolyte material (for example, the first solid electrolyte particle 100) may be in contact with the positive electrode current collector 210.

According to the configuration described above, the charge and discharge efficiency of the battery can be further improved.

Furthermore, the first solid electrolyte particle 100 and the positive electrode active material particle 110 included in the material mixture in the positive electrode layer may be in contact with the positive electrode current collector 210. Consequently, a good and low-resistive interface can be formed, and the charge and discharge efficiency can be improved.

The electrolyte layer 202 is a layer including an electrolyte material. The electrolyte material is, for example, a solid electrolyte material (that is, second solid electrolyte material). That is, the electrolyte layer 202 may be a solid electrolyte layer.

Examples of the second solid electrolyte material contained in the electrolyte layer 202 include the above-mentioned first solid electrolyte material in Embodiment 1. That is, electrolyte layer 202 may include the first solid electrolyte material in Embodiment 1.

According to the composition described above, the charge and discharge efficiency of the battery can be further improved.

Alternatively, the second solid electrolyte material contained in the electrolyte layer 202 may be a halide solid electrolyte material that is different from the first solid electrolyte material in Embodiment 1. That is, the electrolyte layer 202 may include a halide solid electrolyte material different from the first solid electrolyte material in Embodiment 1.

According to the composition described above, the output density and the charge and discharge efficiency of the battery can be improved.

The halide solid electrolyte material contained in the electrolyte layer 202 may include Y as a metal element.

According to the composition described above, the output density and the charge and discharge efficiency of the battery can be further improved.

As the halide solid electrolyte material contained in the electrolyte layer 202, the materials mentioned as the first solid electrolyte material in Embodiment 1 can be used.

As the second solid electrolyte material contained in the electrolyte layer 202, a sulfide solid electrolyte may be used. That is, the electrolyte layer 202 may include a sulfide solid electrolyte.

According to the composition described above, since a sulfide solid electrolyte having excellent reduction stability is included, a low-potential negative electrode material, such as graphite or metal lithium, can be used, and the energy density of the battery can be improved.

As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$ can be used. In addition, for example, LiX (X: F, Cl, Br, or I), $Li_2O$, $MO_q$, or $Li_pMO_q$ (M: P, Si, Ge, B, Al, Ga, In, Fe, or Zn) (p, q: natural number) may be added to the above-mentioned compounds.

As the second solid electrolyte material contained in the electrolyte layer 202, an oxide solid electrolyte, a polymer solid electrolyte, or a complex hydride solid electrolyte may be used.

As the oxide solid electrolyte, for example, an NASICON-type solid electrolyte represented by $LiTi_2(PO_4)_3$ or an element substitute thereof; a $(LaLi)TiO_3$-based perovskite solid electrolyte; an LISICON-type solid electrolyte represented by $Li_{14}ZnGe_4O_{16}$, $Li_4SiO_4$, and $LiGeO_4$, or element substitutes thereof; a garnet-type solid electrolyte represented by $Li_7La_3Zr_2O_{12}$ or an element substitute thereof; $Li_3N$ or an H substitute thereof; $Li_3PO_4$ or an N substitute thereof; or glass or glass-ceramic in which $Li_2SO_4$, $Li_2CO_3$, or the like is added to a Li—B—O compound, such as $LiBO_2$ and $Li_3BO_3$, as a base material can be used.

As the polymer solid electrolyte, for example, a compound composed of a polymer compound and a lithium salt can be used. The polymer compound may have an ethylene oxide structure. A compound having an ethylene oxide structure can contain a large amount of a lithium salt and can further enhance the ionic electrical conductivity. As the lithium salt, for example, $LiPF_6$, $LiBF_4$, $LiSbF_6$, $LiAsF_6$, $LiSO_3CF_3$, $LiN(SO_2CF_3)_2$, $LiN(SO_2C_2F_3)_2$, $LiN(SO_2CF_3)(SO_2C_4F_9)$, and $LiC(SO_2CF_3)_3$ can be used. As the lithium salt, one lithium salt selected from these lithium salts can be used alone. Alternatively, as the lithium salt, a mixture of two or more lithium salts selected from these lithium salts can be used.

As the complex hydride solid electrolyte, for example, $LiBH_4$—LiI or $LiBH_4$—$P_2S_5$ can be used.

Furthermore, the solid electrolyte layer may include the second solid electrolyte material as a main component. That is, the solid electrolyte layer may include the second solid electrolyte material, for example, in a weight proportion of 50% or more (50 wt % or more) based on the total amount of the solid electrolyte layer.

According to the composition described above, the charge and discharge characteristics of the battery can be further improved.

In addition, the solid electrolyte layer may include the second solid electrolyte material, for example, in a weight proportion of 70% or more (70 wt % or more) based on the total amount of the solid electrolyte layer.

According to the composition described above, the charge and discharge characteristics of the battery can be further improved.

Furthermore, the solid electrolyte layer, while including the second solid electrolyte material as a main component, may further include inevitable impurities or a starting material used in the synthesis of the second solid electrolyte material, a by-product, a decomposition product, or the like.

In addition, the solid electrolyte layer may include the second solid electrolyte material, for example, in a weight proportion of 100% (100 wt %) based on the total amount of the solid electrolyte layer excluding inevitable impurities.

According to the composition described above, the charge and discharge characteristics of the battery can be further improved.

As described above, the solid electrolyte layer may be made of the second solid electrolyte material only.

Furthermore, the solid electrolyte layer may include two or more of the materials mentioned as the second solid electrolyte material. For example, the solid electrolyte layer may include a halide solid electrolyte material and a sulfide solid electrolyte material.

The electrolyte layer 202 may have a thickness of 1 μm or more and 300 μm or less. When the thickness of the electrolyte layer 202 is smaller than 1 μm, a risk of a short circuit between the positive electrode 201 and the negative electrode 203 increases. In addition, when the thickness of the electrolyte layer 202 is larger than 300 μm, there is a risk of difficulty in high output operation.

The negative electrode 203 includes a material that has a property of occluding and releasing metal ions (for example, lithium ions). The negative electrode 203 includes, for example, a negative electrode active material.

As the negative electrode active material, for example, a metal material, a carbon material, an oxide, a nitride, a tin compound, or a silicon compound can be used. The metal material may be a single metal. Alternatively, the metal material may be an alloy. Examples of the metal material include a lithium metal and a lithium alloy. Examples of the carbon material include natural graphite, coke, graphitizing carbon, carbon fiber, spherical carbon, artificial graphite, and amorphous carbon. From the viewpoint of capacity density, silicon (Si), tin (Sn), a silicon compound, or a tin compound may be used.

The negative electrode 203 may include a solid electrolyte material. According to the composition described above, it is possible to enhance the lithium ion conductivity inside the negative electrode 203 and allow operation with high output. As the solid electrolyte material, the materials mentioned as examples of the electrolyte layer 202 may be used.

The negative electrode active material particle may have a median diameter of 0.1 μm or more and 100 μm or less. When the median diameter of the negative electrode active material particle is smaller than 0.1 μm, there is a risk that the negative electrode active material particle and the solid electrolyte material cannot form a good dispersion state in the negative electrode. Consequently, the charge and discharge characteristics of the battery are decreased. In addition, when the median diameter of the negative electrode active material particle is larger than 100 μm, the lithium diffusion in the negative electrode active material particle slows down. Consequently, high output operation of the battery may be difficult.

The median diameter of the negative electrode active material particle may be larger than that of the solid electrolyte material. Consequently, a good dispersion state of the negative electrode active material particle and the solid electrolyte material can be formed.

In the volume ratio of the negative electrode active material particle and the solid electrolyte material included in the negative electrode 203, "v: 100−v", 30≤v≤95 may be satisfied. When v<30, there is a risk of difficulty in securing a sufficient energy density of the battery. In addition, when v>95, there is a risk of difficulty in high output operation.

The negative electrode 203 may have a thickness of 10 μm or more and 500 μm or less. When the thickness of the negative electrode is less than 10 μm, there is a risk of difficulty in securing a sufficient energy density of the battery. In addition, when the thickness of the negative electrode is higher than 500 μm, there is a risk of difficulty in high output operation.

At least one of the positive electrode 201, the electrolyte layer 202, and the negative electrode 203 may include a binder in order to improve the adhesion between particles. The binder is used for improving the binding property of the material constituting an electrode. Examples of the binder include polyvinylidene fluoride, polytetrafluoroethylene, polyethylene, polypropylene, aramid resin, polyamide, polyimide, polyamideimide, polyacrylonitrile, polyacrylic acid, methyl polyacrylate, ethyl polyacrylate, hexyl polyacrylate, polymethacrylic acid, methyl polymethacrylate, ethyl polymethacrylate, hexyl polymethacrylate, polyvinyl acetate, polyvinyl pyrrolidone, polyether, polyether sulfone, hexafluoropolypropylene, styrene butadiene rubber, and carboxymethyl cellulose. In addition, as the binder, a copolymer of two or more materials selected from tetrafluoroethylene, hexafluoroethylene, hexafluoropropylene, perfluoroalkyl vinyl ether, fluorinated vinylidene, chlorotrifluoroethylene, ethylene, propylene, pentafluoropropylene, fluoromethyl vinyl ether, acrylic acid, and hexadiene can be used. In addition, a mixture of two or more selected from these compounds may be used as the binder.

At least one of the positive electrode 201 and the negative electrode 203 may include a conductive assistant for enhancing the electronic electrical conductivity. As the conductive assistant, for example, graphite, such as natural graphite and artificial graphite; carbon black, such as acetylene black and ketjen black; electrically conductive fiber, such as carbon fiber and metal fiber; metal powder, such as fluorinated carbon and aluminum; an electrically conductive whisker, such as zinc oxide and potassium titanate; an electrically conductive metal oxide, such as titanium oxide; and an electrically conductive polymer compound, such as polyaniline, polypyrrole, and polythiophene, can be used. When a carbon conductive assistant is used, cost reduction can be achieved.

Furthermore, the battery according to Embodiment 2 can be configured as a battery of various shapes, such as a coin-type, a cylindrical type, a square type, a sheet type, a button type, a flat type, and a stacked type.

EXAMPLES

The details of the present disclosure will now be described using examples and comparative examples.

Example 1

Production of First Solid Electrolyte Material

Raw material powders of LiCl and $YCl_3$ were weighed in a molar ratio of $LiCl:YCl_3=3:1$ in an argon glove box of a dew point of −60° C. or less and were then subjected to milling treatment with a planetary ball mill (manufactured by Fritsch GmbH, P-7 type) at 600 rpm for 25 hours to prepare a powder of a first solid electrolyte material $Li_3YCl_6$.

Production of Positive Electrode Material

The first solid electrolyte material of Example 1 and $LiCoO_2$ as the positive electrode active material were weighed in a volume ratio of the solid electrolyte material: the positive electrode active material=30:70 in an argon glove box and were mixed in an agate mortar to produce a positive electrode material of Example 1 composed of the material mixture.

Production of Secondary Battery

The above-described positive electrode material and the first solid electrolyte material $Li_3YCl_6$ were subjected to the following process.

First, 120 mg of $Li_3YCl_6$ and 8.5 mg of the above-described positive electrode material (positive electrode active material weight: 7.0 mg) were stacked in this order in an insulating outer cylinder and were press-molded at a pressure of 360 MPa to prepare a positive electrode layer made of the material mixture and a solid electrolyte layer made of $Li_3YCl_6$.

Subsequently, 20 mg of an aluminum powder was stacked on the positive electrode side, followed by press-molding at a pressure of 360 MPa to form a current collector on the positive electrode side.

Subsequently, metal In (thickness: 200 μm), metal Li (thickness: 300 μm), and metal In (thickness 200 μm) were stacked in this order on the solid electrolyte layer on the opposite side to the side in contact with the positive electrode, followed by press-molding at a pressure of 40 MPa to produce a layered product composed of the positive electrode, the solid electrolyte layer, and a negative electrode.

Subsequently, stainless steel current collectors were disposed on the top and the bottom of the layered product, and current collecting leads were connected to the current collectors.

Finally, the inside of the insulating outer cylinder was shielded and sealed from the outside atmosphere with an insulating ferrule to produce a battery.

As described above, an all-solid secondary battery of Example 1 was produced.

Charge-Discharge Test and Impedance Test

A charge-discharge test was performed using the all-solid secondary battery of Example 1 under the following conditions.

The battery was placed in a thermostatic chamber of 25° C.

Current-constant charging was performed at a current value of 48 μA, which was 0.05 C rate (20-hour rate) to the theoretical capacity of the battery, and the charging was stopped at a voltage of 3.6 V.

The battery after the completion of the charging was subjected to an AC impedance test under the following conditions: "reference voltage: open circuit voltage", "voltage amplitude: 10 mV", and "frequency: 1 MHz to 0.01 Hz".

Then, discharging was likewise performed at a current value of 48 μA, which was 0.05 C rate, and the discharging was stopped at a voltage of 1.9 V.

Figure 3A:
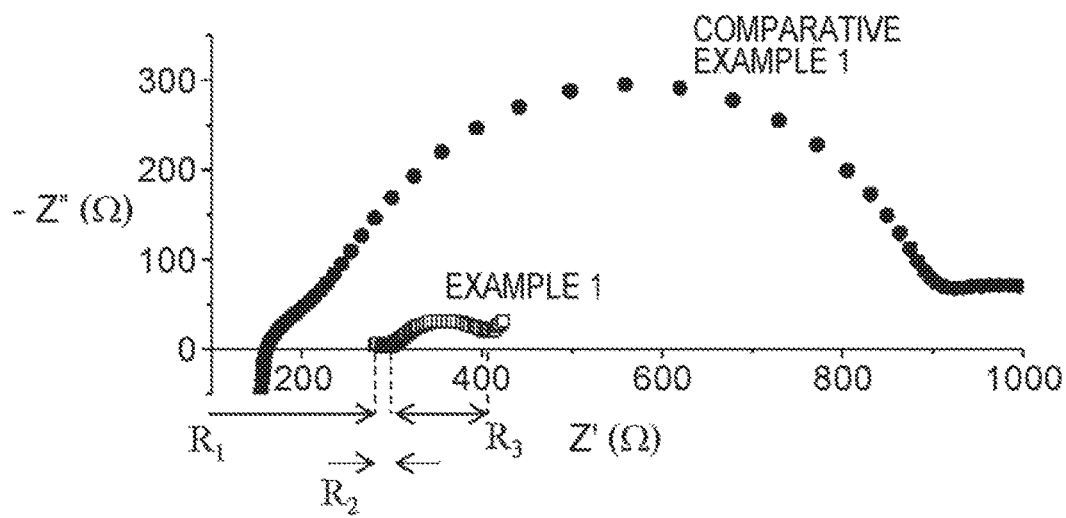
FIG. 3A shows Cole-Cole diagrams obtained by AC impedance measurement in Example 1 and Comparative Example 1.
Figure 3B:
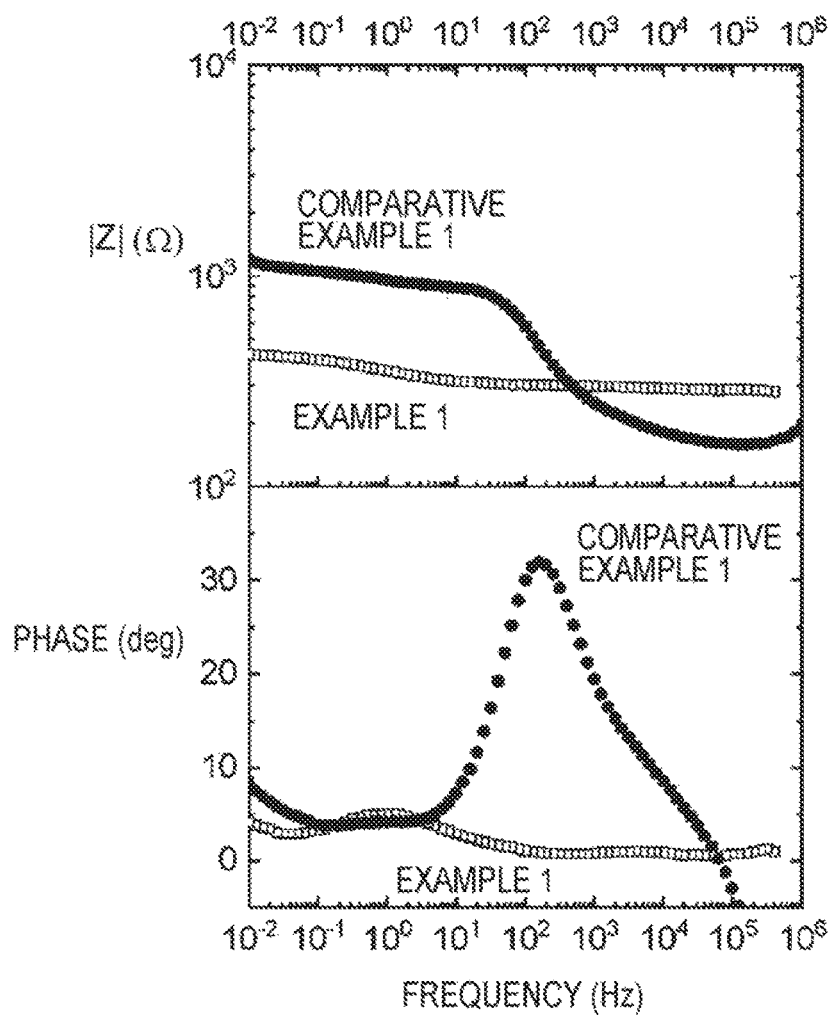
FIG. 3B shows Bode diagrams obtained by AC impedance measurement in Example 1 and Comparative Example 1.

FIGS. 3A and 3B are diagrams showing the results of AC impedance measurement in Example 1 and Comparative Example 1.

The Cole-Cole diagrams and the Bode diagrams obtained by the AC impedance test are shown in FIG. 3A and FIG. 3B, respectively.

In the Cole-Cole diagrams, three resistance components $R_1$, $R_2$, and $R_3$ constituting impedance components were observed. In Bode diagrams, the frequencies of the resistance components $R_1$, $R_2$, and $R_3$ were 70 kHz or more, 500 Hz to 70 kHz, and 40 mHz to 500 Hz, respectively. The values of these frequencies can be each recognized by using the minimum value of the absolute value of the impedance phase as the boundary between the respective impedance components. When separation of the impedance components is difficult, the resistance value of each impedance component can be derived through constitution of an equivalent circuit and fitting thereof. From the values of the frequencies described above, $R_1$ is assigned to the bulk resistance of the solid electrolyte layer, $R_2$ is assigned to the interface resistance between the positive electrode active material and the solid electrolyte, and $R_3$ is assigned to the interface resistance between the negative electrode active material and the solid electrolyte. Accordingly, the bulk resistance of the solid electrolyte was 288 S, the interface resistance between the positive electrode active material and the solid electrolyte was 13 S, and the rate of the positive electrode interface resistance to the solid electrolyte bulk resistance ($R_2/R_1$) was 4.5%.

Figure 4:
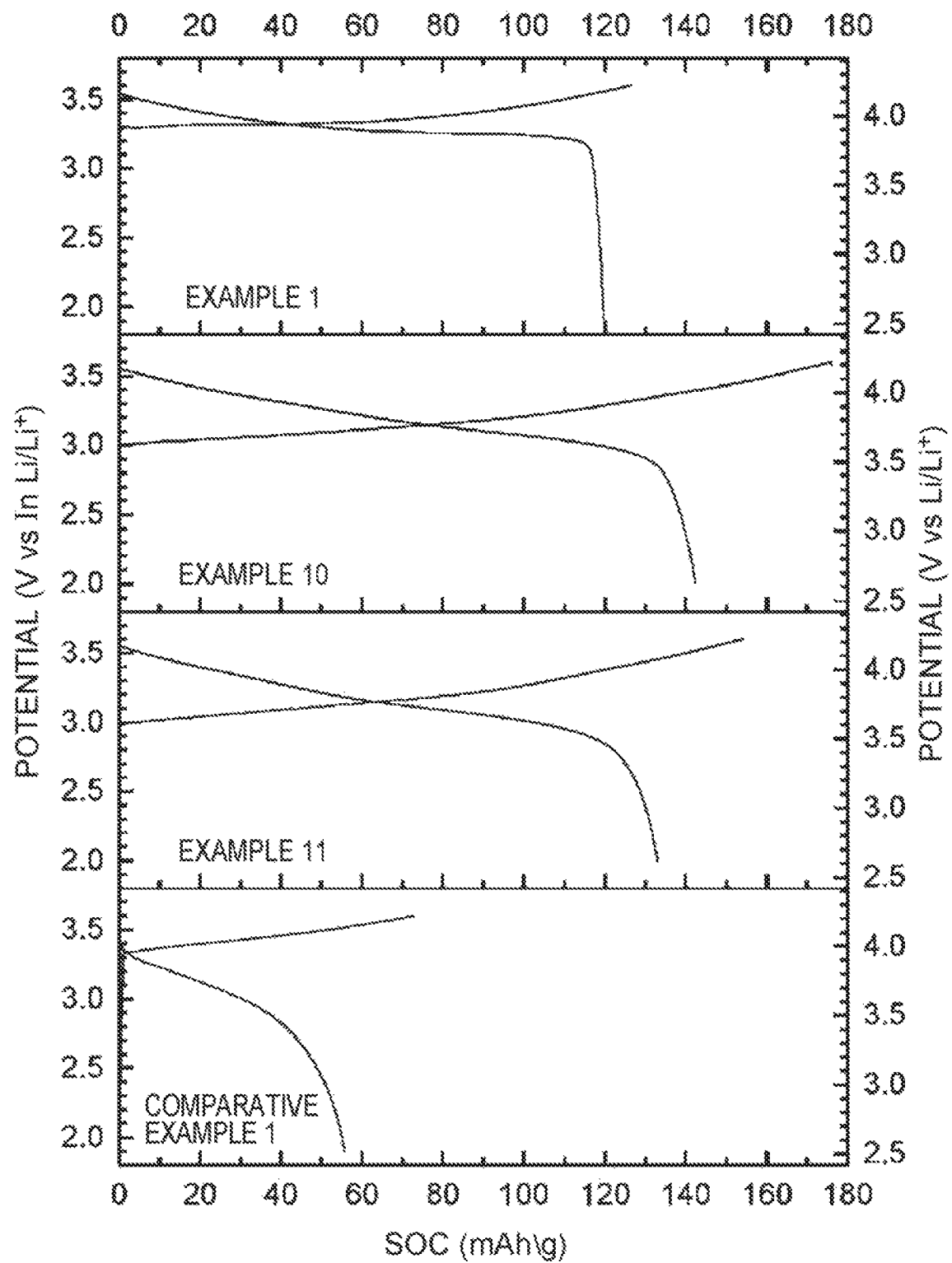
FIG. 4 shows the results of a charge-discharge test in Examples 1, 10, and 11 and Comparative Example 1.

FIG. 4 shows the results of the charge-discharge test in Examples 1, 10, and 11 and Comparative Example 1.

The charge and discharge curves obtained by the charge-discharge test are shown in FIG. 4.

The initial discharge capacity was 0.837 mAh.

The initial charge and discharge efficiency: (initial discharge capacity)/(initial charge capacity), was 94.2%.

The average potentials were calculated from the charge and discharge curves in FIG. 4. In the secondary battery of Example 1, the average charge potential during the charging process was 3.38 V, the average discharge potential during the discharging process was 3.30 V, and the average charge and discharge potential as the average between the average charge potential and the average discharge potential was 3.34 V. When the value relative to the metal lithium potential (0.62 V) of the In negative electrode material used in Example 1 was used, the average charge potential, the average discharge potential, and the average charge and discharge potential relative to metal lithium of the positive electrode material in Example 1 were 4.00 V vs Li/Li$^+$, 3.92 V vs Li/Li$^+$, and 3.96 V vs Li/Li$^+$, respectively.

Example 2

In the production of a first solid electrolyte material, raw material powders of LiBr and YBr$_3$ were weighed in a molar ratio of LiBr:YBr$_3$=3:1 in an argon glove box of a dew point of −60° C. or less, followed by milling treatment with a planetary ball mill (manufactured by Fritsch GmbH, P-7 type) at 600 rpm for 25 hours to prepare a powder of a first solid electrolyte material Li$_3$YBr$_6$.

In the production of a positive electrode material composed of a material mixture and the production of a secondary battery, Li$_3$YBr$_6$ was used as the solid electrolyte material.

Except for the above, the production of a positive electrode material, the production of a secondary battery, a charge-discharge test, and an impedance test were performed as in Example 1.

The initial discharge capacity was 0.599 mAh, and the initial charge and discharge efficiency was 91.1%.

In the secondary battery of Example 2, the average charge potential during the charging process was 3.44 V, the average discharge potential during the discharging process was 3.08 V, and the average charge and discharge potential as the average between the average charge potential and the average discharge potential was 3.26 V. The average charge potential, the average discharge potential, and the average charge and discharge potential relative to metal lithium of the positive electrode material in Example 2 were 4.06 V vs L/Li$^+$, 3.70 V vs Li/Li$^+$, and 3.88 V vs Li/Li$^+$, respectively.

Example 3

In the production of a first solid electrolyte material, raw material powders of LiCl and MgCl$_2$ were weighed in a molar ratio of LiCl:MgCl$_2$=2:1 in an argon glove box of a dew point of −60° C. or less, followed by milling treatment with a planetary ball mill (manufactured by Fritsch GmbH, P-7 type) at 600 rpm for 25 hours to prepare a powder of a first solid electrolyte material Li$_2$MgCl$_4$.

In the production of a positive electrode material, as in Example 1, the first solid electrolyte material of Example 3 and LiCoO$_2$ as the positive electrode active material were weighed in a volume ratio of the solid electrolyte material: the positive electrode active material=30:70 in an argon glove box and were mixed in an agate mortar to produce a positive electrode material of Example 3 composed of the material mixture.

The positive electrode material of Example 3 and the halide solid electrolyte Li$_3$YCl$_6$ produced in Example 1 were subjected to the following process to produce a secondary battery.

First, 120 mg of Li$_3$YCl$_6$ and 8.3 mg of the positive electrode material (active material weight: 7 mg) were stacked in this order in an insulating outer cylinder and were press-molded at a pressure of 360 MPa to prepare a positive electrode layer made of the material mixture and a solid electrolyte layer made of Li$_3$YCl$_6$.

Subsequently, 20 mg of an aluminum powder was stacked on the positive electrode side, followed by press-molding at a pressure of 360 MPa to form a current collector on the positive electrode side.

Subsequently, metal In (thickness: 200 μm), metal Li (thickness: 300 μm), and metal In (thickness 200 μm) were stacked in this order on the solid electrolyte layer on the opposite side to the side in contact with the positive electrode, followed by press-molding at a pressure of 40 MPa to produce a layered product composed of the positive electrode, the solid electrolyte layer, and a negative electrode.

Subsequently, stainless steel current collectors were disposed on the top and the bottom of the layered product, and current collecting leads were connected to the current collectors.

Finally, the inside of the insulating outer cylinder was shielded and sealed from the outside atmosphere with an insulating ferrule to produce a battery.

As described above, an all-solid secondary battery of Example 3 was produced.

A charge-discharge test and an impedance test were performed as in Example 1 except that the tests were performed in a thermostatic chamber of 80° C.

The initial discharge capacity was 0.256 mAh, and the initial charge and discharge efficiency was 81.8%.

In the secondary battery of Example 3, the average charge potential during the charging process was 3.39 V, the average discharge potential during the discharging process was 3.18 V, and the average charge and discharge potential as the average between the average charge potential and the average discharge potential was 3.28 V. The average charge potential, the average discharge potential, and the average charge and discharge potential relative to metal lithium of the positive electrode material in Example 3 were 4.00 V vs Li/Li$^+$, 3.80 V vs Li/Li$^+$, and 3.90 V vs Li/Li$^+$, respectively.

Example 4

In the production of a first solid electrolyte material, raw material powders of LiCl, YCl$_3$, and CaCl$_2$) were weighed in a molar ratio of LiCl:YCl$_3$:CaCl$_2$=3.1:0.9:0.1 in an argon glove box of a dew point of −60° C. or less, followed by milling treatment with a planetary ball mill (manufactured by Fritsch GmbH, P-7 type) at 600 rpm for 25 hours to prepare a powder of a first solid electrolyte material Li$_{3.1}$Y$_{0.9}$Ca$_{0.1}$Cl$_6$.

Except for the above, the positive electrode material and the secondary battery were produced as in Example 3.

A charge-discharge test and an impedance test were performed as in Example 1.

The initial discharge capacity was 0.584 mAh, and the initial charge and discharge efficiency was 87.8%.

Example 5

In the production of a first solid electrolyte material, raw material powders of LiCl, YCl$_3$, and SrCl$_2$ were weighed in a molar ratio of LiCl:YCl$_3$:SrCl$_2$=3.1:0.9:0.1 in an argon glove box of a dew point of −60° C. or less, followed by milling treatment with a planetary ball mill (manufactured by Fritsch GmbH, P-7 type) at 600 rpm for 25 hours to prepare a powder of a first solid electrolyte material Li$_{3.1}$Y$_{0.9}$Sr$_{0.1}$Cl$_6$.

Except for the above, the production of a positive electrode material and a secondary battery, a charge-discharge test, and an impedance test were performed as in Example 4.

The initial discharge capacity was 0.596 mAh, and the initial charge and discharge efficiency was 87.2%.

Example 6

In the production of a first solid electrolyte material, raw material powders of LiCl, YCl$_3$, and BaCl$_2$ were weighed in a molar ratio of LiCl:YCl$_3$:BaCl$_2$=3.1 0.9:0.1 in an argon glove box of a dew point of −60° C. or less, followed by milling treatment with a planetary ball mill (manufactured by Fritsch GmbH, P-7 type) at 600 rpm for 25 hours to prepare a powder of a first solid electrolyte material Li$_{3.1}$Y$_{0.9}$Ba$_{0.1}$Cl$_6$.

Except for the above, the production of a positive electrode material and a secondary battery, a charge-discharge test, and an impedance test were performed as in Example 4.

The initial discharge capacity was 0.619 mAh, and the initial charge and discharge efficiency was 85.8%.

Example 7

In the production of a first solid electrolyte material, raw material powders of LiCl, YCl$_3$, and ZnCl$_2$ were weighed in a molar ratio of LiCl:YCl$_3$:ZnCl$_2$=3.1:0.9:0.1 in an argon glove box of a dew point of −60° C. or less, followed by milling treatment with a planetary ball mill (manufactured by Fritsch GmbH, P-7 type) at 600 rpm for 25 hours to prepare a powder of a first solid electrolyte material Li$_{3.1}$Y$_{0.9}$Zn$_{0.1}$Cl$_6$.

Except for the above, the production of a positive electrode material and a secondary battery, a charge-discharge test, and an impedance test were performed as in Example 4.

The initial discharge capacity was 0.614 mAh, and the initial charge and discharge efficiency was 88.1%.

Example 8

A first solid electrolyte material and a positive electrode material composed of a material mixture were produced as in Example 1.

Production of Sulfide Solid Electrolyte Material

Raw material powders of Li$_2$S and P$_2$S$_5$ were weighed in a molar ratio of Li$_2$S:P$_2$S$_5$=3:1 in an argon glove box of a dew point of −60° C. or less, followed by milling treatment with a planetary ball mill (manufactured by Fritsch GmbH, P-7 type) at 510 rpm for 10 hours to prepare a powder of a sulfide solid electrolyte Li$_2$S—P$_2$S$_5$.

Production of Secondary Battery

The positive electrode material of Example 8, the first solid electrolyte material Li$_6$YCl$_6$, and the sulfide solid electrolyte material Li$_2$S—P$_2$S$_5$ were subjected to the following process to produce a secondary battery.

First, 40 mg of Li$_2$S-P$_2$S$_5$, 60 mg of Li$_6$YCl$_6$, and 8.5 mg of the positive electrode material (active material weight: 7 mg) were stacked in this order in an insulating outer cylinder and were press-molded at a pressure of 360 MPa to prepare a positive electrode layer made of the material mixture and a solid electrolyte layer having a layered structure of Li$_3$YCl$_6$ and Li$_2$S—P$_2$S$_5$.

Subsequently, 20 mg of an aluminum powder was stacked on the positive electrode side, followed by press-molding at a pressure of 360 MPa to form a current collector on the positive electrode side.

Subsequently, metal Li (thickness: 300 μm) was stacked on the solid electrolyte layer on the opposite side to the side in contact with the positive electrode, followed by press-molding at a pressure of 40 MPa to produce a layered product composed of the positive electrode, the solid electrolyte Layer, and a negative electrode.

Subsequently, stainless steel current collectors were disposed on the top and the bottom of the layered product, and current collecting leads were connected to the current collectors.

Finally, the inside of the insulating outer cylinder was shielded and sealed from the outside atmosphere with an insulating ferrule to produce a battery.

As described above, an all-solid secondary battery of Example 8 was produced.

A charge-discharge test and an impedance test were performed as in Example 1 except that the charge end voltage was 4.2 V and the discharge end voltage was 2.5 V.

The initial discharge capacity was 0.338 mAh, and the initial charge and discharge efficiency was 85.4%.

Example 9

A first solid electrolyte material and a positive electrode material composed of a material mixture were produced as in Example 1.

A sulfide solid electrolyte material was produced as in Example 8.

A secondary battery was produced using the positive electrode material of Example 9 and the sulfide solid electrolyte Li$_2$S—P$_2$S$_5$ as in Example 1 except that 80 mg of Li$_2$S—P$_2$S$_5$ and 8.5 mg of the positive electrode material (active material weight: 7 mg) of Example 9 were stacked in this order in an insulating outer cylinder and were press-molded at a pressure of 360 MPa to prepare a positive electrode layer made of the material mixture and a solid electrolyte layer made of Li$_2$S—P$_2$S$_5$.

A charge-discharge test and an impedance test were performed as in Example 1.

The initial discharge capacity was 0.575 mAh, and the initial charge and discharge efficiency was 90.3%.

Example 10

A first solid electrolyte material was produced as in Example 1.

In the production of a positive electrode material made of a material mixture and the production of a secondary battery, Li(NiCoAl)$_2$ was used as the positive electrode material.

Except for the above, the production of a positive electrode material, the production of a secondary battery, a charge-discharge test, and an impedance test were performed as in Example 1.

The initial discharge capacity was 0.997 mAh, and the initial charge and discharge efficiency was 81.1%.

In the secondary battery of Example 10, the average charge potential during the charging process was 3.22 V, the average discharge potential during the discharging process was 3.16 V, and the average charge and discharge potential as the average between the average charge potential and the average discharge potential was 3.19 V. The average charge potential, the average discharge potential, and the average charge and discharge potential relative to metal lithium of the positive electrode material in Example 10 were 3.84 V vs Li/Li$^+$, 3.78 V vs Li/Li$^+$, and 3.81 V vs Li/Li$^+$, respectively.

Example 11

A first solid electrolyte material was produced as in Example 1.

In the production of a positive electrode material made of a material mixture and the production of a secondary battery, Li(NiCoMn)O$_2$ was used as the positive electrode material.

Except for the above, the production of a positive electrode material, the production of a secondary battery, a charge-discharge test, and an impedance test were performed as in Example 1.

The initial discharge capacity was 0.931 mAh, and the initial charge and discharge efficiency was 86.3%.

In the secondary battery of Example 11, the average charge potential during the charging process was 3.22 V, the average discharge potential during the discharging process was 3.13 V, and the average charge and discharge potential as the average between the average charge potential and the average discharge potential was 3.18 V. The average charge potential, the average discharge potential, and the average charge and discharge potential relative to metal lithium of the positive electrode material in Example 11 were 3.84 V vs Li/Li$^+$, 3.75 V vs Li/Li$^+$, and 3.80 V vs Li/Li$^+$, respectively.

Comparative Example 1

A sulfide solid electrolyte material was produced as in Example 8.

In the production of a positive electrode material, LiCoO$_2$ as the positive electrode active material was weighed in a volume ratio of the sulfide solid electrolyte material:the positive electrode active material=50:50 and were mixed in an agate mortar to produce a positive electrode material of Comparative Example 1 composed of the material mixture.

The positive electrode material and the sulfide solid electrolyte material Li$_2$S—P$_2$S$_5$ were subjected to the following process to produce a secondary battery.

First, 80 mg of Li$_2$S—P$_2$S$_5$ and 10 mg of the positive electrode material (active material weight: 7 mg) were stacked in this order in an insulating outer cylinder and were press-molded at a pressure of 360 MPa to prepare a positive electrode layer made of the positive electrode material and a solid electrolyte layer made of Li$_2$S—P$_2$S$_5$.

Except for the above, the production of a secondary battery, a charge-discharge test, and an impedance test were performed as in Example 1.

The initial discharge capacity was 0.389 mAh, and the initial charge and discharge efficiency was 76.5%.

In the secondary battery of Comparative Example 1, the average charge potential during the charging process was 3.44 V, the average discharge potential during the discharging process was 2.94 V, and the average charge and discharge potential as the average between the average charge potential and the average discharge potential was 3.19 V. The average charge potential, the average discharge potential, and the average charge and discharge potential relative to metal lithium of the positive electrode material in Comparative Example 1 were 4.06 V vs Li/Li$^+$, 3.56 V vs Li/Li$^+$, and 3.81 V vs Li/Li$^+$, respectively.

Comparative Example 2

A sulfide solid electrolyte material was produced as in Comparative Example 1.

LiCoO$_2$ as the positive electrode material and the sulfide solid electrolyte material Li$_2$S—P$_2$S$_5$ were subjected to the following process to produce a secondary battery.

First, 80 mg of Li$_2$S—P$_2$S$_5$ and 7 mg of LiCoO$_2$ as the positive electrode active material were stacked in this order in an insulating outer cylinder and were press-molded at a pressure of 360 MPa to prepare a positive electrode layer made of LiCoO$_2$ and a solid electrolyte layer made of Li$_2$S—P$_2$S$_5$.

Except for the above, the production of a secondary battery, a charge-discharge test, and an impedance test were performed as in Comparative Example 1.

The initial discharge capacity was 0.100 mAh, and the initial charge and discharge efficiency was 71.3%.

Comparative Example 3

A first solid electrolyte material was produced as in Example 3.

LiCoO$_2$ as the positive electrode active material and the first solid electrolyte material Li$_3$YCl$_6$ were subjected to the following process to produce a secondary battery.

First, 120 mg of Li$_3$YCl$_6$ and 7 mg of LiCoO$_2$ as the positive electrode active material were stacked in this order in an insulating outer cylinder and were press-molded at a pressure of 360 MPa to prepare a positive electrode layer made of LiCoO$_2$ and a solid electrolyte layer made of Li$_3$YCl$_6$.

Except for the above, the production of a secondary battery, a charge-discharge test, and an impedance test were performed as in Example 3.

The initial discharge capacity was 0.214 mAh, and the initial charge and discharge efficiency was 71.5%.

Incidentally, in the configurations in Examples 1 to 11, the positive electrode active material and the first solid electrolyte material are in direct contact with each other.

Incidentally, in the configurations in Examples 1 to 11, the first solid electrolyte material is in direct contact with the positive electrode current collector.

The battery configurations in Examples 1 to 11 and Comparative Examples 1 to 3 and the evaluation results are shown in Table 1.

TABLE 1

|  | Positive electrode layer | | Solid electrolyte layer | | | Positive |
| --- | --- | --- | --- | --- | --- | --- |
|  | Positive electrode active material | 1st solid electrolyte material | 2nd solid electrolyte material | Negative electrode | Initial charge and discharge efficiency | electrode interface resistance |
| Example 1 | $LiCoO_2$ | $Li_3YCl_6$ | $Li_3YCl_6$ | In—Li | 94.2% | 13Ω |
| Example 2 | $LiCoO_2$ | $Li_3YBr_6$ | $Li_3YBr_6$ | In—Li | 91.1% | 226Ω |
| Example 3 | $LiCoO_2$ | $Li_2MgCl_4$ | $Li_3YCl_6$ | In—Li | 81.8% | 230Ω |
| Example 4 | $LiCoO_2$ | $Li_{3.1}Y_{0.9}Ca_{0.1}Cl_6$ | $Li_3YCl_6$ | In—Li | 87.8% | 24Ω |
| Example 5 | $LiCoO_2$ | $Li_{3.1}Y_{0.9}Sr_{0.1}Cl_6$ | $Li_3YCl_6$ | In—Li | 87.2% | 34Ω |
| Example 6 | $LiCoO_2$ | $Li_{3.1}Y_{0.9}Ba_{0.1}Cl_6$ | $Li_3YCl_6$ | In—Li | 85.8% | 54Ω |
| Example 7 | $LiCoO_2$ | $Li_{3.1}Y_{0.9}Zn_{0.1}Cl_6$ | $Li_3YCl_6$ | In—Li | 88.1% | 78Ω |
| Example 8 | $LiCoO_2$ | $Li_3YCl_6$ | $Li_3YCl_6$, $Li_2S$—$P_2S_5$ | Li | 85.4% | 32Ω |
| Example 9 | $LiCoO_2$ | $Li_3YCl_6$ | $Li_2S$—$P_2S_5$ | In—Li | 90.3% | 111Ω |
| Example 10 | $Li(NiCoAl)O_2$ | $Li_3YCl_6$ | $Li_3YCl_6$ | In—Li | 81.1% | 10Ω |
| Example 11 | $Li(NiCoMn)O_2$ | $Li_3YCl_6$ | $Li_3YCl_6$ | In—Li | 86.3% | 23Ω |
| Comparative Example1 | $LiCoO_2$ | $Li_2S$—$P_2S_5$ | $Li_2S$—$P_2S_5$ | In—Li | 76.5% | 711Ω |
| Comparative Example2 | $LiCoO_2$ | None | $Li_2S$—$P_2S_5$ | In—Li | 71.3% | 779Ω |
| Comparative Example3 | $LiCoO_2$ | None | $Li_3YCl_6$ | In—Li | 71.5% | 424Ω |

Consideration

Comparison of Examples 1 to 11 and Comparative Examples 1 to 3 reveals that in an all-solid secondary battery including a material mixture of a positive electrode active material and a first solid electrolyte material in the positive electrode layer, the charge and discharge efficiency is improved to provide an initial charge and discharge efficiency of 80% or more. In particular, the average charge and discharge potentials of the positive electrode active materials were all 3.7 V vs Li/Li$^+$ or more relative to the redox potential of metal lithium.

In addition, in the configurations of the batteries in Examples 1 to 11, the values of the resistance component corresponding to the positive electrode interface resistance were low, 250Ω or less.

In contrast, in Comparative Examples 1 to 3, the values of the interface resistance were high, 400Ω or more. When the interface resistance is 300Ω or more, the overvoltage is increased as large as 0.3 V or more by a current flow of, for example, 1 mA, and the charge and discharge characteristics are greatly deteriorated.

In particular, comparison of Examples 1 to 11 and Comparative Example 1 reveals that in a similar battery configuration including a first solid electrolyte material in the positive electrode layer, the charge and discharge efficiency is improved.

In addition, comparison of Example 1 and Comparative Example 3 reveals that in batteries using the same first solid electrolyte material, the charge and discharge efficiency is greatly improved by forming the positive electrode layer made of a material mixture of the first solid electrolyte material and the positive electrode active material.

In contrast, in comparison of Comparative Example 1 and Comparative Example 2, in the sulfide solid electrolyte, which is widely used in all-solid batteries, when the positive electrode layer is made of a material mixture of the sulfide solid electrolyte material and the positive electrode active material, although the discharge capacity is increased through improvement in the rate of utilization of the active material, the charge and discharge efficiency is not greatly changed.

Accordingly, it was demonstrated that acquisition of a high charge and discharge efficiency by including the first solid electrolyte material in the positive electrode layer is an effect unique to halides.

What is claimed is:

1. A positive electrode material comprising:
a positive electrode active material; and
a first solid electrolyte material, wherein
the first solid electrolyte material contains Li, M, and X;
M at least contains yttrium; and
X is at least one selected from the group consisting of Cl, Br, and I.

2. The positive electrode material according to claim 1, wherein
the first solid electrolyte material does not contain sulfur.

3. The positive electrode material according to claim 1, wherein
the first solid electrolyte material is represented by compositional formula (1): $Li_\alpha M_\beta X_\gamma$,
where $\alpha$, $\beta$, and $\gamma$ are all values larger than 0.

4. The positive electrode material according to claim 1, wherein
the first solid electrolyte material is in contact with the positive electrode active material.

5. The positive electrode material according to claim 1, wherein
the first solid electrolyte material is $Li_3YCl_6$, or $Li_3YBr_6$.

6. The positive electrode material according to claim 1, wherein
M contains an element selected from the group consisting of Ca, Sr, Ba, and Zn, and yttrium.

7. The positive electrode material according to claim 6, wherein
the first solid electrolyte material is
$Li_{3.1}Y_{0.9}Ca_{0.1}Cl_6$,
$Li_{3.1}Y_{0.9}Sr_{0.1}Cl_6$,
$Li_{3.1}Y_{0.9}Ba_{0.1}Cl_6$, or
$Li_{3.1}Y_{0.9}Zn_{0.1}Cl_6$.

8. The positive electrode material according to claim 1, wherein
the positive electrode active material contains
at least one selected from the group consisting of cobalt, nickel, manganese, and aluminum;
lithium; and
oxygen.

9. The positive electrode material according to claim 8, wherein
the positive electrode active material is
lithium cobalt oxide,
lithium nickel cobalt manganese oxide, or
lithium nickel cobalt aluminum oxide.

10. The positive electrode material according to claim 1, wherein
the positive electrode active material has an average charge and discharge potential higher than a redox potential of metal lithium by 3.7 V or more.

11. A battery comprising:
a positive electrode containing the positive electrode material according to claim 1;
a negative electrode; and
an electrolyte layer disposed between the positive electrode and the negative electrode.

12. The battery according to claim 11, further comprising:
a positive electrode current collector disposed in contact with the positive electrode, wherein
the first solid electrolyte material is in contact with the positive electrode current collector.

13. The battery according to claim 11, wherein
the electrolyte layer contains the first solid electrolyte material.

14. The battery according to claim 11, wherein
the electrolyte layer contains a halide solid electrolyte material different from the first solid electrolyte material.

15. The battery according to claim 11, wherein
the electrolyte layer contains a sulfide solid electrolyte.

16. The positive electrode material according to claim 1, wherein the first solid electrolyte material is a compound represented by the following compositional formula:

$$Li_a Me_b Y_c X_6,$$

where $a+mb+3c=6$, $c>0$, Me is at least one of metal elements other than Li and Y and semimetal elements, and m is a valence of Me.

17. The positive electrode material according to claim 16, wherein Me is any of Mg, Ca, Sr, Ba, Zn, Sc, Al, Ga, Bi, Zr, Hf, Ti, Sn, Ta, and Nb or a mixture thereof.

18. The positive electrode material according to claim 1, wherein the first solid electrolyte material is a compound represented by the following compositional formula (A2):

$$Li_3 Y X_6 \quad (A2),$$

where X is two or more elements selected from the group consisting of Cl, Br, and I.

19. The positive electrode material according to claim 1, wherein the first solid electrolyte material is a compound represented by the following compositional formula (A5):

$$Li_{3-3\delta+a} Y_{1+\delta-a} Me_a Cl_{6-x-y} Br_x I_y \quad (A5),$$

where Me is at least one selected from the group consisting of Mg, Ca, Sr, Ba, and Zn, and $-1<\delta<2$, $0<a<3$, $0<(3-3\delta+a)$, $0<(1+\delta-a)$, $0 \leq x \leq 6$, $0 \leq y \leq 6$, and $(x+y) \leq 6$ are satisfied.

20. The positive electrode material according to claim 1, wherein the first solid electrolyte material is a compound represented by the following compositional formula (A6):

$$Li_{3-3\delta} Y_{1+\delta-a} Me_a Cl_{6-x-y} Br_x I_y \quad (A6),$$

where Me is at least one selected from the group consisting of Al, Sc, Ga, and Bi, and $-1<\delta<1$, $0<a<2$, $0<(1+\delta-a)$, $0 \leq x \leq 6$, $0 \leq y \leq 6$, and $(x+y) \leq 6$ are satisfied.

21. The positive electrode material according to claim 1, wherein the first solid electrolyte material is a compound represented by the following compositional formula (A7):

$$Li_{3-3\delta-a} Y_{1+\delta-a} Me_a Cl_{6-x-y} Br_x I_y \quad (A7),$$

where Me is at least one selected from the group consisting of Zr, Hf, and Ti, and $-1<\delta<1$, $0<a<1.5$, $0<(3-3\delta-a)$, $0<(1+\delta-a)$, $0 \leq x \leq 6$, $0 \leq y \leq 6$, and $(x+y) \leq 6$ are satisfied.

22. The positive electrode material according to claim 1, wherein the first solid electrolyte material is a compound represented by the following compositional formula (A8):

$$Li_{3-3\delta-2a} Y_{1+\delta-a} Me_a Cl_{6-x-y} Br_x I_y \quad (A8),$$

where Me is at least one selected from the group consisting of Ta and Nb, and $-1<\delta<1$, $0<a<1.2$, $0<(3-3\delta-2a)$, $0<(1+\delta-a)$, $0 \leq x \leq 6$, $0 \leq y \leq 6$, and $(x+y) \leq 6$ are satisfied.

* * * * *